(12) United States Patent
Kuusisaari et al.

(10) Patent No.: US 10,536,335 B2
(45) Date of Patent: Jan. 14, 2020

(54) METHOD FOR MANAGING CONFIGURATION OF A NETWORK ELEMENT AND A NETWORK ELEMENT

(71) Applicant: Coriant Oy, Espoo (FI)

(72) Inventors: Juhamatti Kuusisaari, Helsinki (FI); Ville Hallivuori, Espoo (FI)

(73) Assignee: Coriant Oy (FI)

( * ) Notice: Subject to any disclaimer, the term of this patent is extended or adjusted under 35 U.S.C. 154(b) by 4 days.

(21) Appl. No.: 16/063,646

(22) PCT Filed: Dec. 18, 2015

(86) PCT No.: PCT/FI2015/050912
§ 371 (c)(1),
(2) Date: Jun. 18, 2018

(87) PCT Pub. No.: WO2017/103322
PCT Pub. Date: Jun. 22, 2017

(65) Prior Publication Data
US 2019/0007267 A1    Jan. 3, 2019

(51) Int. Cl.
*H04L 12/24*    (2006.01)
*H04L 12/723*    (2013.01)
*H04L 12/743*    (2013.01)

(52) U.S. Cl.
CPC ...... *H04L 41/0816* (2013.01); *H04L 41/0893* (2013.01); *H04L 45/50* (2013.01); *H04L 45/7453* (2013.01)

(58) Field of Classification Search
None
See application file for complete search history.

(56) References Cited

U.S. PATENT DOCUMENTS

| 8,619,780 | B1 | 12/2013 | Brandwine et al. |
| 2011/0013551 | A1 | 1/2011 | Shiroko et al. |
| 2014/0325038 | A1* | 10/2014 | Kis ............... H04L 41/0803 709/220 |

(Continued)

OTHER PUBLICATIONS

International Search Report, PCT/FI2015/050912, dated Jul. 20, 2016.

(Continued)

*Primary Examiner* — Eunsook Choi
(74) *Attorney, Agent, or Firm* — Young & Thompson

(57) ABSTRACT

A network element includes control entities (102, 103) and controllable entities (104-105) such as line interface units. The control entities configure the controllable entities to enable the network element to operate in a data transfer network. Each control entity maintains a configuration data-set in accordance with configuration information based on data received from the data transfer network and transmits the configuration data-set to one or more controllable entities. The control entity applies a configuration rule on the configuration information and updates the configuration data-set on the basis of the result of the configuration rule. The configuration rule is stateless so that its result is independent of earlier results of the configuration rule and of earlier configuration information. The control entities are enabled to keep their configuration data-sets nearly congruent with each other because they use the same configuration information and the same stateless configuration rule.

27 Claims, 3 Drawing Sheets

(56) References Cited

U.S. PATENT DOCUMENTS

| | | | |
|---|---|---|---|
| 2015/0131667 A1 | 5/2015 | Ko et al. | |
| 2015/0215156 A1* | 7/2015 | Yoon | H04L 45/64 370/225 |
| 2016/0205071 A1* | 7/2016 | Cooper | H04L 12/6418 726/1 |
| 2017/0230239 A1* | 8/2017 | Zhang | H04L 12/6418 |

OTHER PUBLICATIONS

Bhuvaneswaran Vengainathan Anton Basil Veryx Technologies Mark Tassinari Hewlett-Packard Vishwas Manral Ionos Corp Sarah Banks VSS: "Terminology for Benchmarking SDN Controller Performance; draft-ietf-bmwg-sdn-controller-benchmark-term-00.txt", Terminology for Benchmarking SDN Controller Performance; draft-ietf-bmwg-sdn-controller-benchmark-term-00.txt, Internet Engineering Task Force, IETF; Standardworkingdraft, Internet Society (ISOC) 4.

* cited by examiner

METHOD FOR MANAGING CONFIGURATION OF A NETWORK ELEMENT AND A NETWORK ELEMENT

FIELD OF THE DISCLOSURE

The disclosure relates generally to configuring a network element such as e.g. a router, to operate as a part of a data transfer network. More particularly, the disclosure relates to a control entity, such as a control unit "CU", of a network element and to a controllable entity, such as a line interface unit "LIU", of a network element. Furthermore, the disclosure relates to a method and to a computer program for managing configuration of a network element. Furthermore, the disclosure relates to a network element such as e.g. a router.

BACKGROUND

In many cases a network element of a data transfer network is modular so that the network element comprises control entities and controllable entities. The network element can be for example an Internet Protocol "IP" router, a MultiProtocol Label Switching "MPLS" switch, a packet optical switch, an Ethernet switch, and/or a software-defined networking "SDN" controlled network element. Each of the control entities can be for example a physical control unit "CU" of the network element or a control process to be run in the network element such as a routing protocol process e.g. a protocol independent multicast—sparse mode "PIM-SM" process. Each of the controllable entities can be for example a line interface unit "LIU" e.g. a line card, a software-based forwarder process, or a virtualized network function. The control entities are adapted to configure the controllable entities so that the network element constitutes a part of the data transfer network in a desired way. The control entities can be adapted to run for example control-plane functionalities and the controllable entities can be adapted to run for example data-plane functionalities in accordance with the configuration received from the control entities.

An inherent advantage of having many control entities is that the control entities can be adapted to backup each other. On the other hand, an inherent challenge related to this approach is the need to ensure that configuration data-sets maintained by different ones of the control entities are sufficiently congruent with each other. The configuration data-set may indicate for example the allocation of hardware "HW" resources and/or software "SW" implemented resources of controllable entities for implementing desired forwarding functionalities. Each controllable entity, e.g. a line interface unit "LIU", controlled by a control entity should be able to continue its operation without too big disturbances after a switchover where the above-mentioned control entity has been replaced by another control entity for controlling the controllable entity under consideration. A typical approach for maintaining sufficient congruency between the above-mentioned configuration data-sets is a synchronization mechanism where backup control entities receive update data from a primary control entity so that the backup control entities are enabled to keep their configuration data-sets sufficiently congruent with that of the primary control entity. For large configuration data-sets, a synchronization mechanism of the kind mentioned above can be error-prone and time consuming, and furthermore changes in the configurations of the controllable entities can be blocked when the synchronization mechanism is in operation. For near real-time applications such blocking is not desirable and should be avoided. For example, when the PIM-SM is used for implementing a video service, a user may feel it unsatisfactory if changing a channel takes a long time because of being temporarily blocked by a synchronization mechanism of the kind mentioned above.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying embodiments of the invention.

In accordance with the invention, there is provided a new control entity for a network element that comprises one or more controllable entities. The control entity can be for example a physical control unit "CU" of the network element or a control process such as a routing protocol process to be run in the network element. Each controllable entity can be for example a line interface unit "LIU" e.g. a line card, a software-based forwarder process, or a virtualized network function.

A control entity according to the invention comprises:
 a communication mechanism for transmitting and receiving data to and from the controllable entities, and
 a configuration mechanism for maintaining a configuration data-set in accordance with configuration information received from one or more of the controllable entities and at least partly based on data received at the one or more of the controllable entities from a data transfer network, and for controlling the communication mechanism to transmit the configuration data-set to at least one of the controllable entities.

The above-mentioned configuration data-set expresses allocation of at least one of the following resources for implementing the desired forwarding functionalities of the at least one of the controllable entities: hardware "HW" resources of the at least one of the controllable entities and/or software "SW" implemented resources of the at least one of the controllable entities.

The above-mentioned configuration mechanism is adapted to apply a configuration rule on the above-mentioned configuration information and to update the configuration data-set at least partly on the basis of the result of the configuration rule so as to maintain the configuration data-set. The configuration rule is stateless, i.e. memoryless, so that the result of the configuration rule is independent of earlier results of the configuration rule and of earlier configuration information.

Different control entities of the network element are enabled to keep their configuration data-sets nearly congruent with each other because each of the control entities is adapted to use, for maintaining its configuration data-set, the same configuration information and the same stateless configuration rule, e.g. a hash function, which is applied on the configuration data and whose results are independent of the history.

In accordance with the invention, there is provided also a new controllable entity for a network element that comprises control entities for configuring the controllable entity so as to enable the network element to operate as a part of a data transfer network.

A controllable entity according to the invention comprises:
- a data transfer interface for communicatively connecting to the data transfer network,
- a communication mechanism for transmitting configuration information to the control entities and for receiving a configuration data-set from each of the control entities, the configuration information being at least partly based on data received from the data transfer network, and
- a configuring mechanism adapted to:
  - maintain configuration definitions each being based on one of the received configuration data-sets,
  - select one of the configuration definitions on the basis of status information expressing which one of the control entities is controlling the controllable entity and which ones of the control entities are backups, and
  - allocate, on the basis of the selected one of the configuration definitions, at least one of the following resources to implement the forwarding functionalities of the controllable entity: hardware "HW" resources of the controllable entity and/or software "SW" implemented resources of the controllable entity.

In accordance with the invention, there is provided also a new network element that can be for example an Internet Protocol "IP" router, a multiprotocol label switching "MPLS" switch, a packet optical switch, an Ethernet switch, and/or a software-defined networking "SDN" controlled network element. A network element according to the invention comprises:
- one or more control entities according to the invention, and
- one or more controllable entities according to the invention.

In accordance with the invention, there is provided also a new method for managing configuration of a network element that comprises one or more control entities and one or more controllable entities. A method according to the invention comprises:
- receiving, at each of the control entities, configuration information from one or more of the controllable entities, the configuration information being at least partly based on data received at the one or more of the controllable entities from a data transfer network,
- maintaining, at each of the control entities, a configuration data-set in accordance with the received configuration information, the configuration data-set expressing allocation of at least one of the following resources for implementing the forwarding functionalities of at least one of the controllable entities: hardware "HW" resources of the at least one of the controllable entities and/or software "SW" implemented resources of the at least one of the controllable entities, and
- transmitting the configuration data-set from each of the control entities to the at least one of the controllable entities so as to keep a resource allocation of the at least one of the controllable entities updated.

The above-mentioned maintaining the configuration data-set comprises:
- applying a configuration rule on the configuration information, and
- updating the configuration data-set at least partly on the basis of the result of the configuration rule, the configuration rule being stateless so that the result of the configuration rule is independent of earlier results of the configuration rule and of earlier configuration information.

In accordance with the invention, there is provided also a new computer program for a control entity of a network element that comprises one or more controllable entities. The computer program comprises computer executable instructions for controlling a programmable processing system of the control entity to:
- maintain a configuration data-set of the kind mentioned above in accordance with configuration information received from one or more of the controllable entities, the configuration information being at least partly based on data received at the one or more of the controllable entities from a data transfer network, and
- control a communication mechanism of the control entity to transmit the configuration data-set to at least one of the controllable entities, and
- apply a configuration rule on the configuration information and update the configuration data-set at least partly on the basis of the result of the configuration rule so as to maintain the configuration data-set, the configuration rule being stateless so that the result of the configuration rule is independent of earlier results of the configuration rule and of earlier configuration information.

In accordance with the invention, there is provided also a new computer program for a controllable entity of a network element that comprises control entities for configuring the controllable entity. The computer program comprises computer executable instructions for controlling a programmable processing system of the controllable entity to:
- control a communication mechanism of the controllable entity to transmit configuration information to the control entities, the configuration information being at least partly based on data received from a data transfer network,
- maintain configuration definitions each being based on one of configuration data-sets received from the control entities,
- select one of the configuration definitions on the basis of status information expressing which one of the control entities is controlling the controllable entity and which ones of the control entities are backups, and
- allocate, on the basis of the selected one of the configuration definitions, at least one of the following resources to implement the forwarding functionalities of the controllable entity: hardware "HW" resources of the controllable entity and/or software "SW" implemented resources of the controllable entity.

In accordance with the invention, there is provided also a new computer program product. The computer program product comprises a non-volatile computer readable medium, e.g. a compact disc "CD", encoded with a computer program according to the invention for a control entity of a network element and/or a computer program according to the invention for a controllable entity of a network element.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features.

The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description below are not exhaustive unless otherwise explicitly stated.

Figure 1:
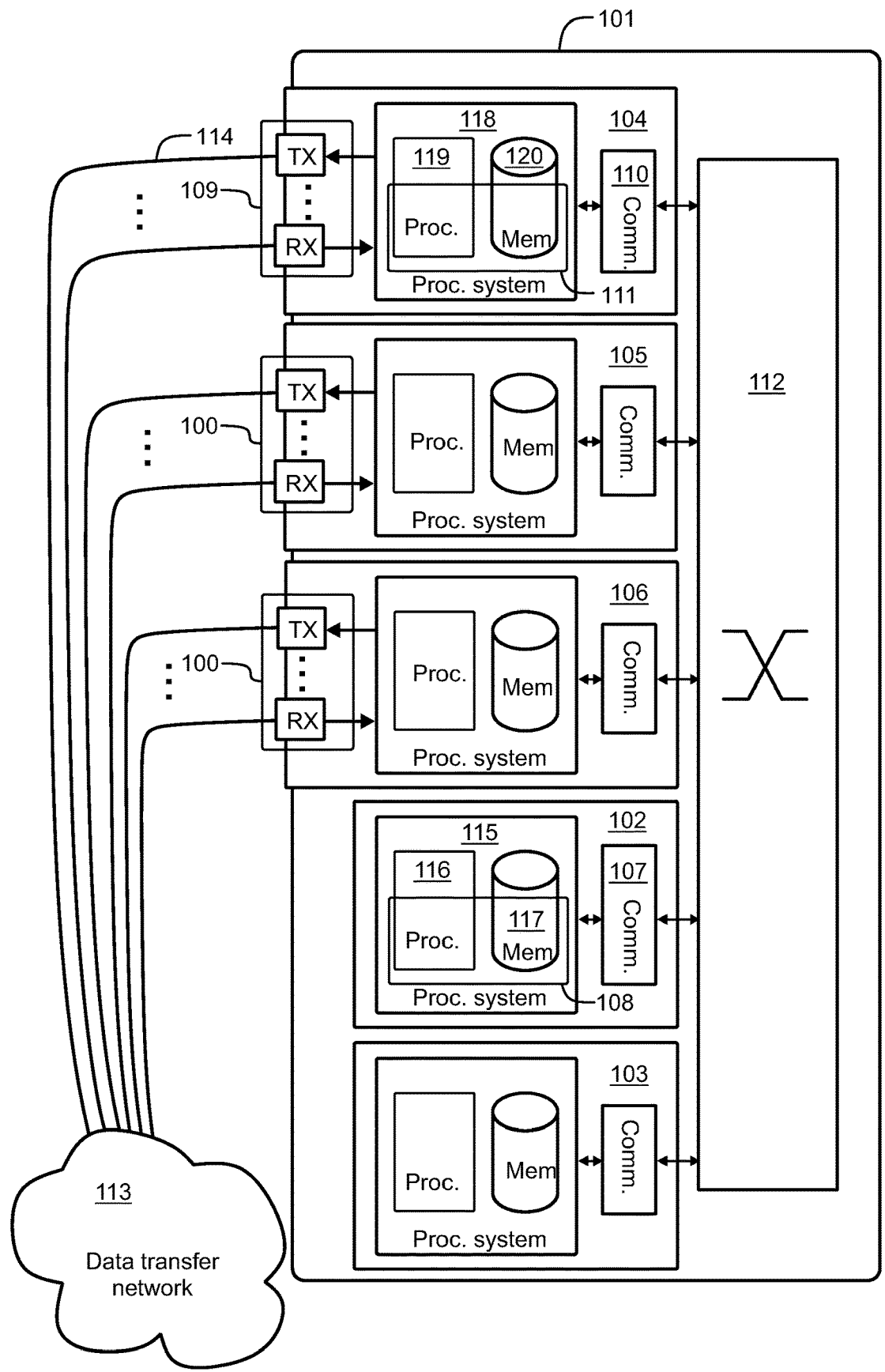
FIG. 1 shows a schematic illustration of a network element according to an exemplifying and non-limiting embodiment of the invention.

FIG. 1 shows a schematic illustration of a network element 101 according to an exemplifying and non-limiting embodiment of the invention. The network element 101 can be for example an Internet Protocol "IP" router, a multiprotocol label switching "MPLS" switch, a packet optical switch, an Ethernet switch, and/or a software-defined networking "SDN" controlled network element. The exemplifying network element 101 is modular so that the network element comprises control entities 102 and 103 and controllable entities 104, 105, and 106. Furthermore, the network element 101 may comprise one or more control entities and/or one or more controllable entities which is/are not shown in FIG. 1. In the exemplifying case illustrated FIG. 1, the functional entities represented by the control entities 102 and 103 and the controllable entities 104-106 are adapted to communicate with each other via a switch fabric 112. It is, however, also possible that the network element comprises a backplane or another data transfer system that is adapted to constitute a full-mesh connection arrangement between the functional entities represented by the control entities 102 and 103 and the controllable entities 104-106.

In the exemplifying case illustrated FIG. 1, each of the control entities 102 and 103 is a physical control unit "CU". It is, however, also possible that the network element 101 comprises one or more other control entities each of which can be for example a control process to be run in the network element 101. A control process representing a control entity can be for example a routing protocol process such as e.g. a protocol independent multicast—sparse mode "PIM-SM" process. In the exemplifying case illustrated FIG. 1, each of the controllable entities 104-106 is a line interface unit "LIU" that comprises a data transfer interface for communicatively connecting to a data transfer network. In FIG. 1, a portion of the data transfer network outside the network element 101 is depicted with a cloud 113. In FIG. 1, the data transfer interface of the controllable entity 104 is denoted with a figure reference 109 and one of data transfer links connected to the data transfer interface 109 is denoted with a figure reference 114. It is, however, also possible that a controllable entity is for example a software-based forwarder process or a virtualized network function. In this exemplifying case, the data transfer interface of the controllable entity can be for example a software-based process for managing reception and transmission of data.

The control entities 102 and 103 are adapted to configure the controllable entities 104-106 so that the network element 101 constitutes a part of the data transfer network in a desired way. The control entities can be adapted to run for example control-plane functionalities and the controllable entities can be adapted to run for example data-plane functionalities in accordance with the configuration received from the control entities.

The control entity 102 is considered below for the sake of illustrative purposes. The control entity 103 can be similar to the control entity 102. The control entity 102 comprises a communication mechanism 107 for transmitting and receiving data to and from the controllable entities 104-106. The control entity 102 comprises a configuration mechanism 108 for maintaining a configuration data-set in accordance with configuration information received from one or more of the controllable entities 104-106. The configuration information is at least partly based on data received at the one or more of the controllable entities 104-106 from the data transfer network. For example, the configuration information may comprise information based on routing data delivered by one or more routing protocols running in the data transfer network, link status data indicative of statuses of the data transfer links connected to the network element 101, and/or data related to traffic forwarded by the network element 101. The routing data may indicate for example sub-networks accessible via given egress ports of the network element 101, the link status data may indicate for example whether each data transfer link is operating or out-of-order, and the data related to the forwarded data traffic may indicate for example statistics and/or other information related to the forwarded data traffic.

The above-mentioned configuration data-set is a resource allocation data-set that expresses allocations of resources of one or more of the controllable entities 104-106 for implementing desired forwarding functionalities of the network element 101. Each of the resources being allocated can be for example a hardware "HW" resource such as e.g. an egress port, a processor circuit, or a memory area of the controllable entity under consideration. It is also possible that a resource being allocated is a software "SW" implemented resource such as e.g. an identifier, a label value, or similar which is used by different functional entities of the network element and thus has to be managed so that conflicts, i.e. unintentional coincidences, with other corresponding SW-implemented resources do not take place. Furthermore, a SW-implemented resource can be for example a software-based function or process that can be allocated for implementing at least a part of a particular forwarding functionality e.g. for implementing a functionality related to a particular virtual private network "VPN", a virtual local access network "VLAN", or similar. The above-mentioned configuration data-set is sent from the control entity 102 to one or more of the controllable entities 104-106 so as to enable the one or more of the controllable entities 104-106 to implement the desired forwarding functionalities.

In order to maintain the above-mentioned configuration data-set, the configuration mechanism 108 is adapted to apply a configuration rule on the above-mentioned configuration information and to update the configuration data-set at least partly on the basis of the result of the configuration rule. The configuration rule is stateless, i.e. memoryless, so that the result of the configuration rule is independent of earlier results of the configuration rule and of earlier configuration information. The configuration rule can be based on for example a suitable hash function. The control entities 102 and 103 of the network element 101 are enabled to keep their configuration data-sets nearly congruent with each other because they are adapted to use the same configuration information and the same stateless configuration rule whose results are independent of the history. In situations where pieces of the configuration information are received at different control entities at different times i.e. not simultaneously, there can be occasional differences between the configuration data-sets in a case of e.g. hash collisions or similar. It is however possible to complement the configuration mechanisms of the control entities with a comparison and difference removing mechanism which does not however need to operate at such a rate as the above-mentioned configuration mechanisms.

Figure 2:
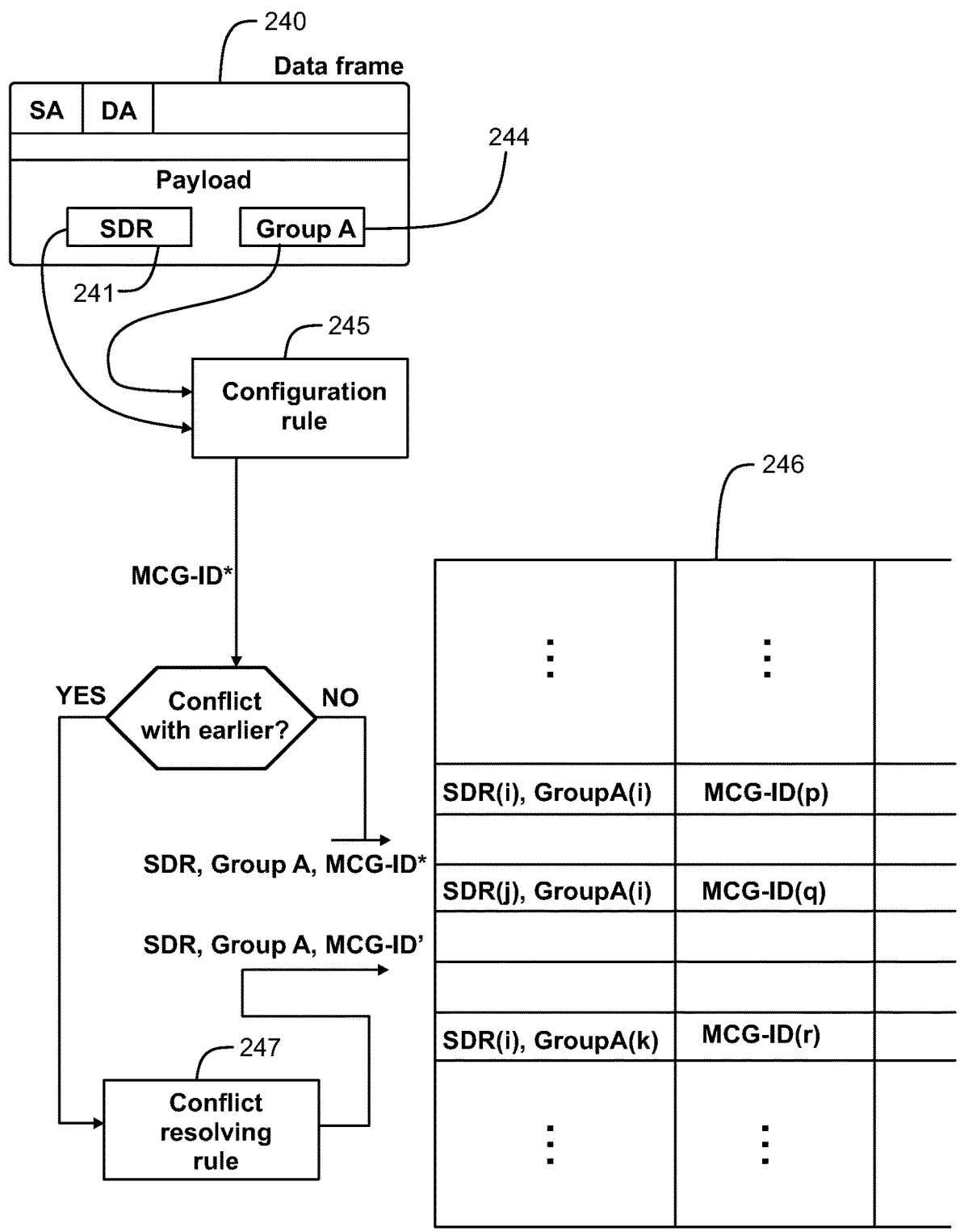
FIG. 2 illustrates operation of a control entity of the network element shown in FIG. 1 in an exemplifying situation.

The operation of the configuration mechanism 108 in an exemplifying situation is described below with reference to FIG. 2. The exemplifying situation illustrated in FIG. 2 is related to the protocol independent multicast—sparse mode "PIM-SM", where multicast group identifiers "MCG-ID"s are used for controlling delivery and copying of multicast data frames in the network element 101. For example, when a multicast data frame is received at the controllable entity 104, the controllable entity 104 reads the source address "SA" and the multicast group address "Group A" from the received data frame and uses the SA and the Group A as a lookup key for retrieving the relevant MCG-ID from a lookup table or another data retrieval system. On the basis of the MCG-ID, the controllable entity 104 retrieves information which indicates functional entities of the network element 101 where the received data frame and zero or more copies of the received data frame is/are to be delivered to. In this exemplifying case, the multicast group identifiers MCG-IDs represent software "SW" implemented resources which are used by different functional entities of the network element and thus have to be managed so that conflicts do not take place. The above-mentioned lookup table or other data retrieval system which returns the MCG-ID on the basis of the SA and the Group A represents a part of the configuration of the controllable entity 104. The controllable entity 104 maintains this part of its configuration on the basis of a corresponding part of a configuration data-set that is received from the control entity 102 or 103. In FIG. 2, the above-mentioned part of the configuration data-set is denoted with a figure reference 246. In FIG. 2, indices i, j, k, p, q, and r are used for expressing different values of the source address "SA", the multicast group address "Group A", and the multicast group identifier "MCG-ID". In the above-described example, it is assumed that the source address SA indicates the sender of the multicast group.

A data frame 240 shown in FIG. 2 is assumed to represent at least a part of control data for establishing multicast forwarding functionalities in the network element 101. The data frame 240 can represent for example at least a part of PIM-SM control data. Without limiting generality, we can assume that the data frame 240 is received at the controllable entity 104 from the data transfer network. The controllable entity 104 sends the multicast sender identifier "SDR" 241, the multicast group address "Group A" 244, and possibly also other data contained by the data frame 240 to the control entities 102 and 103. Therefore, in this exemplifying case, the SDR 241, the Group A 244, and the possible other data represent the configuration information based on data received at the controllable entity 104 from the data transfer network. It is also possible that the controllable entity 104 sends the whole data frame 240 to the control entities 102 and 103. The configuration mechanism 108 of the control entity 102 is adapted to apply a configuration rule 245 on the above-mentioned configuration information and to update the part 246 of the configuration data-set at least partly on the basis of the result of the configuration rule. Advantageously, the configuration mechanism of the control entity 103 operates in the same way.

The configuration rule 245 may comprise for the Secure Hash Algorithm 1 "SHA-1", the Message Digest 5 "MD5", the Fowler-Noll-Vo 32 "FNV-32", or a modulo operation. The configuration rule 245 can be applied on a bit vector obtained by concatenating the SDR 241 and the Group A 244. The result of the configuration rule 245 is a candidate multicast group identifier MCG-ID*. The MCG-ID* is, together with the SDR 241 and the Group A 244, inserted in the part 246 of the configuration data-set if the MCG-ID* does not have a conflict with an earlier defined portion of the configuration data-set by coinciding with an earlier defined multicast group identifier obtained with different configuration information i.e. with a different bit vector constituted by a multicast sender identifier and a multicast group address.

In a control entity according to an exemplifying and non-limiting embodiment of the invention, the configuration rule 245 comprises a first configuration sub-rule comprising application of the Secure Hash Algorithm 1 "SHA-1", the Message Digest 5 "MD5", or the Fowler-Noll-Vo 32 "FNV-32" on the configuration information. The configuration rule 245 further comprises a second configuration sub-rule comprising identifying a predetermined set of bits from the result of the first configuration sub-rule. The predetermined set of bits can be for example a predetermined number of least significant bits "LSB"s of the result of the first configuration sub-rule.

The configuration mechanism 108 of the control entity 102 is advantageously adapted to apply a conflict resolving rule 247 in response to a situation which the result MCG-ID* of the configuration rule 245 has a conflict with an earlier defined portion of the configuration data-set by coinciding with an earlier result of the configuration rule obtained with different configuration information, i.e. with a different bit vector constituted by a multicast sender identifier and a multicast group address.

In a control entity according to an exemplifying and non-limiting embodiment of the invention, the conflict resolving rule 247 comprises replacing the result of the configuration rule MCG-ID* with a value MCG-ID' which is closest to MCG-ID* from among values which are free from conflicts with the earlier defined portion of the configuration data-set. For example, if the part 246 of the configuration data-set already contains the multicast group identifier MCG-ID* but does not contain a multicast group identifier MCG-ID*+1, MCG-ID* is replaced with MCG-ID*+1 and a data triplet the MCG-ID*+1, the SA 240, the Group A 244 is inserted in the part 246 of the configuration data-set, i.e. MCG-ID'=MCG-ID*+1. If the part 246 of the configuration data-set already contains the MCG-ID* and the MCG-ID*+1 but does not contain MCG-ID*−1, MCG-ID* is replaced with the MCG-ID*−1, i.e. MCG-ID'=MCG-ID*−1. If the part 246 of the configuration data-set already contains the MCG-ID*, the MCG-ID*+1, and the MCG-ID*−1 but does not contain MCG-ID*+2, the MCG-ID* is replaced with the MCG-ID*+2, i.e. MCG-ID'=MCG-ID*+2, and so on. This exemplifying conflict resolving rule is however not stateless because its result is dependent on the currently prevailing configuration data-set and thereby its result is dependent on the history. This may cause differences between the configuration data-sets of the control entities 102 and 103 in situations where pieces of the configuration information are received at different times i.e. not simultaneously, at the control entities 102 and 103. As mentioned above, it is possible to complement the configuration mechanisms of the control entities 102 and 103 with a comparison and difference removing mechanism which does not need to operate at such a rate as the main mechanism.

In a control entity according to another exemplifying and non-limiting embodiment of the invention, the conflict resolving rule 247 comprises a first conflict resolving sub-rule comprising application of the Secure Hash Algorithm 1 "SHA-1", the Message Digest 5 "MD5", the Fowler-Noll-Vo 32 "FNV-32", or a modulo operation on the result MCG-ID* of the configuration rule 245. The conflict resolving rule 247 further comprises a second conflict resolving sub-rule comprising replacing the MCG-ID* with the result of the first conflict resolving sub-rule.

In a control entity according to an exemplifying and non-limiting embodiment of the invention, the conflict resolving rule 247 comprises a first conflict resolving sub-rule comprising application of the Secure Hash Algorithm 1 "SHA-1", the Message Digest 5 "MD5", the Fowler-Noll-Vo 32 "FNV-32", or a modulo operation on the result MCG-ID* of the configuration rule 245. The conflict resolving rule 247 further comprises a second conflict resolving sub-rule comprising replacing the MCG-ID* with a predetermined set of bits of the result of the first conflict resolving sub-rule. The predetermined set of bits can be for example a predetermined number of least significant bits "LSB"s of the result of the first conflict resolving sub-rule.

In a control entity according to an exemplifying and non-limiting embodiment of the invention, the conflict resolving rule 247 comprises repeating the following sequence of steps a, b, and c until the result of the configuration rule MCG-ID* is free from conflicts with the earlier defined portion of the configuration data-set:
  a) modifying the configuration information, e.g. the concatenation of the SDR 241 and the Group A 244, according to a modification rule,
  b) directing the configuration rule 245 to the modified configuration information,
  c) changing the modification rule in response to a situation which the result of the configuration rule has a conflict with the earlier defined portion of the configuration data-set.

The modification rule may comprise for example attaching a modification data item to the configuration information. The changing the modification rule may comprise for example changing the modification data item. The modification data item can be for example a sequence number which is incremented, or decremented, in the step c of the above-presented sequence. The sequence number can be attached to the configuration information by e.g. concatenation.

In the exemplifying network element 101 shown in FIG. 1, the configuration mechanism of each of the control entities 102 and 103 is implemented with a processing system of the control entity under consideration. The processing system comprises a processing section and a memory section. In FIG. 1, the processing system of the control entity 102 is denoted with a figure reference 115, the processing section of the processing system 115 is denoted with a figure reference 116, and the memory section of the processing system 115 is denoted with a figure reference 117. The processing section may comprise one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". The memory section may comprise one or more memory circuits each of which can be e.g. a random access memory circuit "RAM" or a content access memory circuit "CAM".

Without limiting the generality, the controllable entity 104 is considered below for the sake of illustrative purposes. The controllable entity 104 comprises a communication mechanism 110 for transmitting the above-mentioned configuration information to the control entities 102 and 103 and for receiving the above-mentioned configuration data-sets from the control entities. The controllable entity comprises a configuring mechanism 111 adapted to maintain configuration definitions each being based on one of the received configuration data-sets. The configuring mechanism 111 is adapted to select one of the configuration definitions on the basis of status information expressing which one of the control entities 102 and 103 is controlling the controllable entity 104 and which one of the control entities acts as a backup. The configuring mechanism 111 is adapted allocate, on the basis of the selected one of the configuration definitions, hardware "HW" resources of the controllable entity 104 and/or software "SW" implemented resources of the controllable entity 104 for implementing the forwarding functionalities of the controllable entity 104.

Without limiting the generality, we can assume that the control entity 102 controls the controllable entity 104 and the control entity 103 acts as a backup. In this exemplifying situation, the configuring mechanism 111 of the controllable entity 104 selects the configuration definition that is maintained on the basis of the configuration data-set received from the control entity 102 and the configuring mechanism 111 carries out the resource allocation in accordance with this configuration definition. It is however worth noting that, concerning for example the controllable entity 105, the situation can be opposite so that the control entity 103 controls the controllable entity 105 and the control entity 102 acts as a backup.

In a switchover where the control responsibility related to the controllable entity 104 is switched from the control entity 102 to the control entity 103, the above-mentioned status information is changed to indicate that the control entity 103 controls the controllable entity 104. Thus, after the switchover, the configuring mechanism 111 of the controllable entity 104 selects the configuration definition that is maintained on the basis of the configuration data-set received from the control entity 103 and carries out the resource allocation in accordance with this configuration definition. In conjunction with many embodiments of the invention, the switchover in a controllable entity does not need to take place immediately after, or simultaneously with, a transfer of the control responsibility from one control entity to another control entity because the configuration definitions based on the configuration data-sets received from both of these control entities are maintained and thus are available in the controllable entity. Thus, the controllable entity can be constantly ready for the switchover.

In the exemplifying network element 101 shown in FIG. 1, the configuring mechanism of each of the controllable entities 104-106 is implemented with a processing system of the controllable entity under consideration. The processing system comprises a processing section and a memory section. In FIG. 1, the processing system of the controllable entity 104 is denoted with a figure reference 118, the processing section of the processing system 118 is denoted with a figure reference 119, and the memory section of the processing system 118 is denoted with a figure reference 120. The processing section may comprise one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". The memory section may comprise one or more memory circuits each of which can be e.g. a random access memory circuit "RAM" or a content access memory circuit "CAM".

Figure 3:
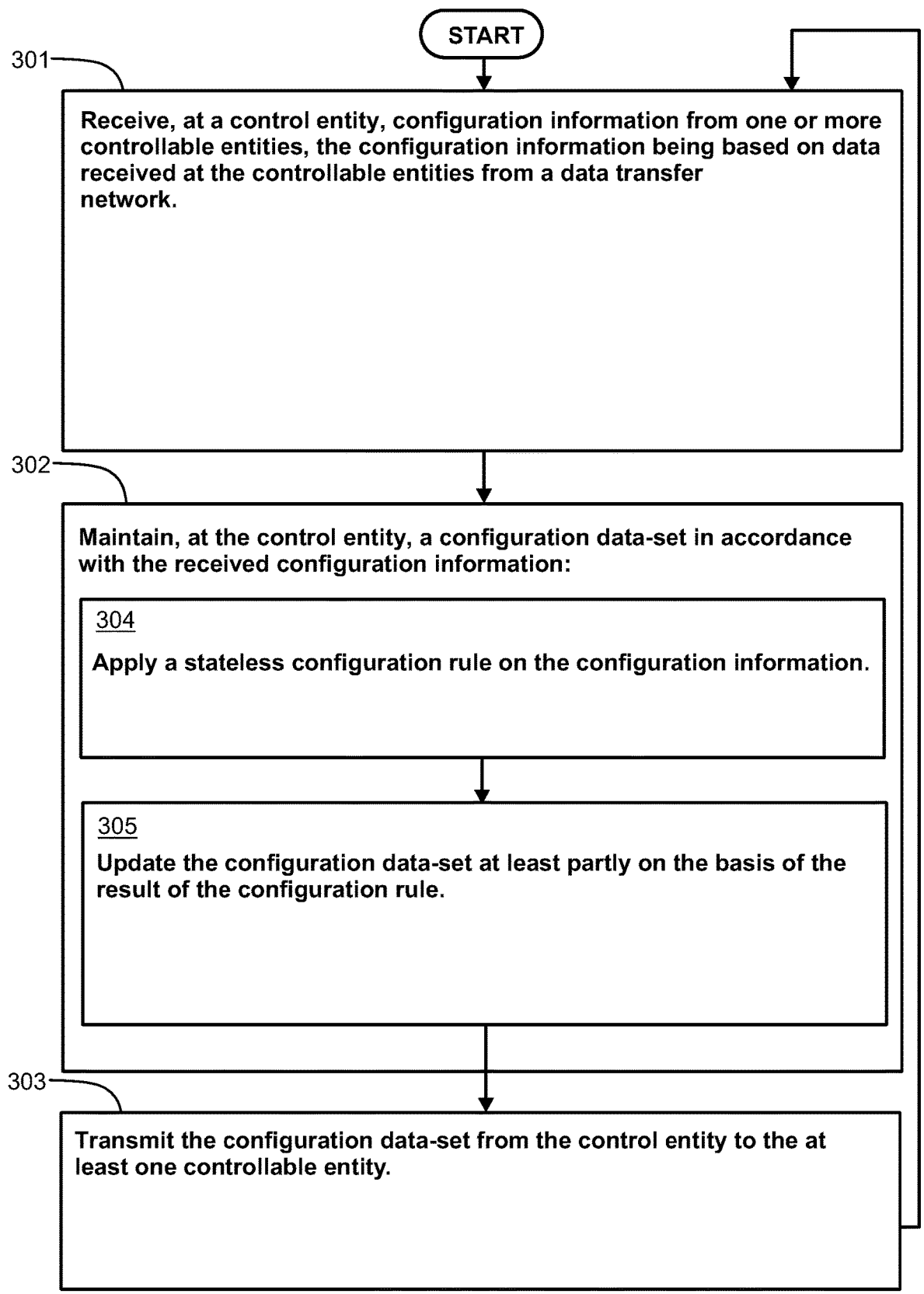
FIG. 3 shows a flowchart of a method according to an exemplifying and non-limiting embodiment of the invention for managing configuration of a network element.

FIG. 3 shows a flowchart of a method according to an exemplifying and non-limiting embodiment of the invention for managing configuration of a network element that comprises one or more control entities and one or more controllable entities. The method comprises the following actions:
- action 301: receiving, at each of the control entities, configuration information from one or more of the controllable entities, the configuration information being at least partly based on data received at the one or more of the controllable entities from a data transfer network,
- action 302: maintaining, at each of the control entities, a configuration data-set in accordance with the received configuration information, the configuration data-set expressing allocation of at least one of the following resources for implementing forwarding functionalities of at least one of the controllable entities: hardware "HW" resources of the at least one of the controllable entities and/or software "SW" implemented resources of the at least one of the controllable entities, and
- action 303: transmitting the configuration data-set from each of the control entities to the at least one of the controllable entities so as to keep a resource allocation of the at least one of the controllable entities updated, The maintaining 302 the configuration data-set comprises the following actions:
- action 304: applying a configuration rule on the configuration information, and
- action 305: updating the configuration data-set at least partly on the basis of the result of the configuration rule, the configuration rule being stateless so that the result of the configuration rule is independent of earlier results of the configuration rule and of earlier configuration information.

A method according to an exemplifying and non-limiting embodiment of the invention further comprises the following actions at the at least one of the controllable entities:
- transmitting the configuration information to the control entities,
- receiving, from each of the control entities, the configuration data-set,
- maintaining configuration definitions each being based on one of the received configuration data-sets,
- selecting one of the configuration definitions on the basis of status information expressing which one of the control entities is controlling the controllable entity under consideration and which ones of the control entities is/are backups, and
- allocating, on the basis of the selected one of the configuration definitions, at least one of the following resources to implement forwarding functionalities of the controllable entity under consideration: hardware "HW" resources of the controllable entity and/or software "SW" implemented resources of the controllable entity.

In a method according to an exemplifying and non-limiting embodiment of the invention, the configuration rule comprises application of one of the following on the configuration information: the Secure Hash Algorithm 1 "SHA-1", the Message Digest 5 "MD5", the Fowler-Noll-Vo 32 "FNV-32", or a modulo operation.

In a method according to an exemplifying and non-limiting embodiment of the invention, the configuration rule comprises:
- a first configuration sub-rule comprising application of one of the following on the configuration information: the Secure Hash Algorithm 1 "SHA-1", the Message Digest 5 "MD5", or the Fowler-Noll-Vo 32 "FNV-32", and
- a second configuration sub-rule comprising identifying a predetermined set of bits from a result of the first configuration sub-rule.

A method according to an exemplifying and non-limiting embodiment of the invention comprises applying a conflict resolving rule in response to a situation which the result of the configuration rule has a conflict with an earlier defined portion of the configuration data-set by coinciding with an earlier result of the configuration rule obtained with different configuration information.

In a method according to an exemplifying and non-limiting embodiment of the invention, the conflict resolving rule comprises replacing the result of the configuration rule with a value which is closest to the result of the configuration rule from among values which are free from conflicts with the earlier defined portion of the configuration data-set.

In a method according to an exemplifying and non-limiting embodiment of the invention, the conflict resolving rule comprises:
- a first conflict resolving sub-rule comprising application of one of the following on the result of the configuration rule: the Secure Hash Algorithm 1 "SHA-1", the Message Digest 5 "MD5", the Fowler-Noll-Vo 32 "FNV-32", or a modulo operation, and
- a second conflict resolving sub-rule comprising replacing the result of the configuration rule with the result of the first conflict resolving sub-rule.

In a method according to an exemplifying and non-limiting embodiment of the invention, the conflict resolving rule comprises;
- a first conflict resolving sub-rule comprising application of one of the following on the result of the configuration rule: the Secure Hash Algorithm 1 "SHA-1", the Message Digest 5 "MD5", or the Fowler-Noll-Vo 32 "FNV-32", and
- a second conflict resolving sub-rule comprising replacing the result of the configuration rule with a predetermined set of bits of the result of the first conflict resolving sub-rule.

In a method according to an exemplifying and non-limiting embodiment of the invention, the conflict resolving rule comprises repeating the following sequence until the result of the configuration rule is free from conflicts with the earlier defined portion of the configuration data-set:

modifying the configuration information according to a modification rule, directing the configuration rule to the modified configuration information, changing the modification rule in response to a situation which the result of the configuration rule has a conflict with the earlier defined portion of the configuration data-set.

In a method according to an exemplifying and non-limiting embodiment of the invention, the above-mentioned modification rule comprises attaching a modification data item to the configuration information and the above-mentioned changing the modification rule comprises changing the modification data item.

A method according to an exemplifying and non-limiting embodiment of the invention comprises applying the configuration rule on at least one of the following each representing at least a part of the configuration information: information based on routing data delivered by one or more routing protocols, information based on link status data indicative of status of one or more data transfer links connected to the controllable entities, and/or information based on data traffic forwarded by the network element.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for controlling a control entity of a network element that comprises one or more controllable entities. The software modules comprise computer executable instructions for controlling a programmable processing system of the control entity to:

maintain a configuration data-set in accordance with configuration information received from one or more of the controllable entities, the configuration information being at least partly based on data received at the one or more of the controllable entities from a data transfer network and the configuration data-set expressing allocation of at least one of the following resources for implementing forwarding functionalities of at least one of the controllable entities: hardware "HW" resources of the at least one of the controllable entities and/or software "SW" implemented resources of the at least one of the controllable entities, and control a communication mechanism of the control entity to transmit the configuration data-set to the at least one of the controllable entities, and apply a configuration rule on the configuration information and update the configuration data-set at least partly on the basis of the result of the configuration rule so as to maintain the configuration data-set, the configuration rule being stateless so that the result of the configuration rule is independent of earlier results of the configuration rule and of earlier configuration information.

A computer program according to an exemplifying and non-limiting embodiment of the invention comprises software modules for controlling a controllable entity of a network element that comprises control entities for configuring the controllable entity so as to enable the network element to operate as a part of a data transfer network. The software modules comprise computer executable instructions for controlling a programmable processing system of the controllable entity to:

control a communication mechanism of the controllable entity to transmit configuration information to the control entities, the configuration information being at least partly based on data received from a data transfer network, maintain configuration definitions each being based on one of configuration data-sets received from the control entities, select one of the configuration definitions on the basis of status information expressing which one of the control entities is controlling the controllable entity and which ones of the control entities are backups, and allocate, on the basis of the selected one of the configuration definitions, at least one of the following resources to implement the forwarding functionalities of the controllable entity: hardware "HW" resources of the controllable entity and/or software "SW" implemented resources of the controllable entity.

The above-mentioned software modules can be e.g. subroutines or functions implemented with a suitable programming language and with a compiler suitable for the programming language and the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an embodiment of invention for controlling a control entity and/or a computer program according to an embodiment of invention for controlling a controllable entity.

A signal according to an exemplifying and non-limiting embodiment of the invention is encoded to carry information defining a computer program according to an embodiment of invention for controlling a control entity and/or a computer program according to an embodiment of invention for controlling a controllable entity.

The specific examples provided in the description given above should not be construed as limiting the scope and/or the applicability of the appended claims. Lists and groups of examples provided in the description given above are not exhaustive unless otherwise explicitly stated.

What is claimed is:

1. A control entity for a network element that comprises one or more controllable entities, the control entity comprising:

a communication mechanism for transmitting and receiving data to and from the one or more controllable entities, and a configuration mechanism for maintaining a configuration data-set in accordance with configuration information received from the one or more controllable entities and at least partly based on data received at the one or more controllable entities from a data transfer network, and for controlling the communication mechanism to transmit the configuration data-set to at least one controllable entity of the one or more controllable entities, wherein the configuration data-set expresses allocation of at least one of the following resources for implementing forwarding functionalities of the at least one controllable entity: hardware "HW" resources of the at least one controllable entity, software "SW" implemented resources of the at least one controllable entity, and wherein the configuration mechanism is adapted to apply a configuration rule on the configuration information and to update the configuration data-set at least partly on the basis of a result of the configuration rule so as to maintain the configuration data-set, the configuration rule being stateless so that the result of the configuration rule is independent of earlier results of the configuration rule and of earlier configuration information.

2. The control entity according to claim 1, wherein the configuration rule comprises application of one of the following on the configuration information: Secure Hash Algorithm 1 "SHA-1", Message Digest 5 "MD5", Fowler-Noll-Vo 32 "FNV-32", a modulo operation.

3. The control entity according to claim 1, wherein the configuration rule comprises:
a first configuration sub-rule comprising application of one of the following on the configuration information: Secure Hash Algorithm 1 "SHA-1", Message Digest 5 "MD5", Fowler-Noll-Vo 32 "FNV-32", and
a second configuration sub-rule comprising identifying a predetermined set of bits from a result of the first configuration sub-rule.

4. The control entity according to claim 1, wherein the configuration mechanism is adapted to apply a conflict resolving rule in response to a situation which the result of the configuration rule has a conflict with an earlier defined portion of the configuration data-set by coinciding with an earlier result of the configuration rule obtained with different configuration information.

5. The control entity according to claim 4, wherein the conflict resolving rule comprises replacing the result of the configuration rule with a value which is closest to the result of the configuration rule from among values which are free from conflicts with the earlier defined portion of the configuration data-set.

6. The control entity according to claim 4, wherein the conflict resolving rule comprises:
a first conflict resolving sub-rule comprising application of one of the following on the result of the configuration rule: Secure Hash Algorithm 1 "SHA-1", Message Digest 5 "MD5", Fowler-Noll-Vo 32 "FNV-32", a modulo operation, and
a second conflict resolving sub-rule comprising replacing the result of the configuration rule with a result of the first conflict resolving sub-rule.

7. The control entity according to claim 4, wherein the conflict resolving rule comprises;
a first conflict resolving sub-rule comprising application of one of the following on the result of the configuration rule: Secure Hash Algorithm 1 "SHA-1", Message Digest 5 "MD5", Fowler-Noll-Vo 32 "FNV-32", and
a second conflict resolving sub-rule comprising replacing the result of the configuration rule with a predetermined set of bits of a result of the first conflict resolving sub-rule.

8. The control entity according to claim 4, wherein the conflict resolving rule comprises repeating the following sequence until the result of the configuration rule is free from conflicts with the earlier defined portion of the configuration data-set:
modifying the configuration information according to a modification rule,
directing the configuration rule to the modified configuration information,
changing the modification rule in response to a situation which the result of the configuration rule has a conflict with the earlier defined portion of the configuration data-set.

9. The control entity according to claim 8, wherein the modification rule comprises attaching a modification data item to the configuration information, and the changing the modification rule comprises changing the modification data item.

10. The control entity according to claim 1, wherein the configuration mechanism is adapted to apply the configuration rule on at least one of the following each representing at least a part of the configuration information: information based on routing data delivered by one or more routing protocols, information based on link status data indicative of status of one or more data transfer links connected to the one or more controllable entities, information based on data traffic forwarded by the network element.

11. The controllable entity for a network element that comprises control entities for configuring the controllable entity so as to enable the network element to operate as a part of a data transfer network, the controllable entity comprising:
a data transfer interface for communicatively connecting to the data transfer network, and
a communication mechanism for transmitting configuration information to the control entities and for receiving a configuration data-set from each of the control entities, the configuration information being at least partly based on data received from the data transfer network,
wherein the controllable entity further comprises a configuring mechanism adapted to:
maintain configuration definitions each being based on one of the received configuration data-sets,
select one of the configuration definitions on the basis of status information expressing which one of the control entities is controlling the controllable entity and which ones of the control entities are backups, and
allocate, on the basis of the selected one of the configuration definitions, at least one of the following resources to implement forwarding functionalities of the controllable entity: hardware "HW" resources of the controllable entity, software "SW" implemented resources of the controllable entity.

12. The controllable entity according to claim 11, wherein the controllable entity is one of the following: a line interface unit for connecting to one of more data transfer links of the data transfer network, a software-based forwarder process, a virtualized network function.

13. The network element for a data transfer network, the network element comprising:
one or more control entities according to claim 1,
one or more controllable entities,
wherein each of the one or more control entities comprises:
a communication mechanism for transmitting and receiving data to and from the one or more controllable entities, and
a configuration mechanism for maintaining a configuration data-set in accordance with configuration information received from the one or more controllable entities and at least partly based on data received at the one or more controllable entities from the data transfer network, and for controlling the communication mechanism to transmit the configuration data-set to at least one controllable entity of the one or more controllable entities, the configuration data-set expressing allocation of at least one of the following resources for implementing forwarding functionalities of the at least one controllable entity: hardware "HW" resources of the at least one controllable entity, software "SW" implemented resources of the at least one controllable entity, and the configuration mechanism being adapted to apply a configuration rule on the configuration information and to update the configuration data-set at least partly on the basis of a result of the configuration rule so as to maintain the configuration data-set, the configuration rule being stateless so that the result of the configuration rule is independent of earlier results of the configuration rule and of earlier configuration information, and wherein each of the one or more controllable entities comprises:
  a data transfer interface for communicatively connecting to the data transfer network,
  a communication mechanism for transmitting the configuration information to the one or more control entities and for receiving the configuration data-set from each of the one or more control entities, and
  a configuring mechanism adapted to:
    maintain configuration definitions each being based on one of the received configuration data-sets,
    select one of the configuration definitions on the basis of status information expressing which one of the one or more control entities is controlling the controllable entity and which ones of the one or more control entities are backups, and
    allocate, on the basis of the selected one of the configuration definitions, at least one of the following resources to implement forwarding functionalities of the controllable entity: hardware "HW" resources of the controllable entity, software "SW" implemented resources of the controllable entity.

14. The network element according to claim 13, wherein the network element is at least one of the following: an Internet Protocol IP router, a MultiProtocol Label Switching MPLS switch, a packet optical switch, an Ethernet switch, a software-defined networking "SDN" controlled network element.

15. A method for managing configuration of a network element that comprises one or more control entities and one or more controllable entities, the method comprising:
  receiving, at each of the one or more control entities, configuration information from the one or more controllable entities, the configuration information being at least partly based on data received at the one or more controllable entities from a data transfer network,
  maintaining, at each of the one or more control entities, a configuration data-set in accordance with the received configuration information, the configuration data-set expressing allocation of at least one of the following resources for implementing forwarding functionalities of at least one controllable entity of the one or more controllable entities: hardware "HW" resources of the at least one controllable entity, software "SW" implemented resources of the at least one controllable entity, and
  transmitting the configuration data-set from each of the one or more control entities to the at least one controllable entity so as to keep a resource allocation of the at least one controllable entity updated, wherein the maintaining the configuration data-set comprises:
  applying a configuration rule on the configuration information, and
  updating the configuration data-set at least partly on the basis of a result of the configuration rule, the configuration rule being stateless so that the result of the configuration rule is independent of earlier results of the configuration rule and of earlier configuration information.

16. The method according to claim 15, wherein the method comprises at the at least one controllable entities:
  transmitting the configuration information to the one or more control entities,
  receiving, from each of the one or more control entities, the configuration data-set,
  maintaining configuration definitions each being based on one of the received configuration data-sets,
  selecting one of the configuration definitions on the basis of status information expressing which one of the one or more control entities is controlling the controllable entity under consideration and which ones of the one or more control entities are backups, and
  allocating, on the basis of the selected one of the configuration definitions, at least one of the following resources to implement forwarding functionalities of the controllable entity under consideration: hardware "HW" resources of the controllable entity, software "SW" implemented resources of the controllable entity.

17. The method according to claim 15, wherein the configuration rule comprises application of one of the following on the configuration information: Secure Hash Algorithm 1 "SHA-1", Message Digest 5 "MD5", Fowler-Noll-Vo 32 "FNV-32", a modulo operation.

18. The method according to claim 15, wherein the configuration rule comprises:
  a first configuration sub-rule comprising application of one of the following on the configuration information: Secure Hash Algorithm 1 "SHA-1", Message Digest 5 "MD5", Fowler-Noll-Vo 32 "FNV-32", and
  a second configuration sub-rule comprising identifying a predetermined set of bits from a result of the first configuration sub-rule.

19. The method according to claim 15, wherein the method comprises applying a conflict resolving rule in response to a situation which the result of the configuration rule has a conflict with an earlier defined portion of the configuration data-set by coinciding with an earlier result of the configuration rule obtained with different configuration information.

20. The method according to claim 19, wherein the conflict resolving rule comprises replacing the result of the configuration rule with a value which is closest to the result of the configuration rule from among values which are free from conflicts with the earlier defined portion of the configuration data-set.

21. The method according to claim 19, wherein the conflict resolving rule comprises:
  a first conflict resolving sub-rule comprising application of one of the following on the result of the configuration rule: Secure Hash Algorithm 1 "SHA-1", Message Digest 5 "MD5", Fowler-Noll-Vo 32 "FNV-32", a modulo operation, and
  a second conflict resolving sub-rule comprising replacing the result of the configuration rule with a result of the first conflict resolving sub-rule.

22. The method according to claim 19, wherein the conflict resolving rule comprises;
  a first conflict resolving sub-rule comprising application of one of the following on the result of the configuration rule: Secure Hash Algorithm 1 "SHA-1", Message Digest 5 "MD5", Fowler-Noll-Vo 32 "FNV-32", and
  a second conflict resolving sub-rule comprising replacing the result of the configuration rule with a predetermined set of bits of a result of the first conflict resolving sub-rule.

23. The method according to claim 19, wherein the conflict resolving rule comprises repeating the following sequence until the result of the configuration rule is free from conflicts with the earlier defined portion of the configuration data-set:
  modifying the configuration information according to a modification rule,
  directing the configuration rule to the modified configuration information,
  changing the modification rule in response to a situation which the result of the configuration rule has a conflict with the earlier defined portion of the configuration data-set.

24. The method according to claim 23, wherein the modification rule comprises attaching a modification data item to the configuration information, and the changing the modification rule comprises changing the modification data item.

25. The method according to claim 15, wherein the method comprises applying the configuration rule on at least one of the following each representing at least a part of the configuration information: information based on routing data delivered by one or more routing protocols, information based on link status data indicative of status of one or more data transfer links connected to the one or more controllable entities, information based on data traffic forwarded by the network element.

26. A non-transitory computer readable medium encoded with a computer program for a control entity of a network element that comprises one or more controllable entities, the computer program comprising computer executable instructions for controlling a programmable processing system of the control entity to:
  maintain a configuration data-set in accordance with configuration information received from the one or more controllable entities, the configuration information being at least partly based on data received at the one or more controllable entities from a data transfer network, and
  control a communication mechanism of the control entity to transmit the configuration data-set to at least one controllable entity of the one or more controllable entities,
  wherein the configuration data-set expresses allocation of at least one of the following resources for implementing forwarding functionalities of the at least one controllable entity: hardware "HW" resources of the at least one controllable entity, software "SW" implemented resources of the at least one controllable entity, and wherein the computer program comprises computer executable instructions for controlling the programmable processing system of the control entity to apply a configuration rule on the configuration information and to update the configuration data-set at least partly on the basis of a result of the configuration rule so as to maintain the configuration data-set, the configuration rule being stateless so that the result of the configuration rule is independent of earlier results of the configuration rule and of earlier configuration information.

27. A non-transitory computer readable medium encoded with a computer program for a controllable entity of a network element that comprises control entities for configuring the controllable entity so as to enable the network element to operate as a part of a data transfer network, the computer program comprises computer executable instructions for controlling a programmable processing system of the controllable entity to:
  control a communication mechanism of the controllable entity to transmit configuration information to the control entities, the configuration information being at least partly based on data received from the data transfer network,
  maintain configuration definitions each being based on one of configuration data-sets received from the control entities,
  select one of the configuration definitions on the basis of status information expressing which one of the control entities is controlling the controllable entity and which ones of the control entities are backups, and
  allocate, on the basis of the selected one of the configuration definitions, at least one of the following resources to implement forwarding functionalities of the controllable entity: hardware "HW" resources of the controllable entity, software "SW" implemented resources of the controllable entity.

* * * * *